March 21, 1950  L. A. DAILEY  2,500,933
CONTROL DEVICE FOR MACHINE TOOLS
Filed April 30, 1948  6 Sheets-Sheet 1

Fig.1.

Inventor
Lewis A. Dailey

March 21, 1950 L. A. DAILEY 2,500,933
CONTROL DEVICE FOR MACHINE TOOLS
Filed April 30, 1948 6 Sheets-Sheet 2

Inventor
Lewis A. Dailey
By Hamilton Jones
Attorney

March 21, 1950 L. A. DAILEY 2,500,933
CONTROL DEVICE FOR MACHINE TOOLS
Filed April 30, 1948 6 Sheets-Sheet 3

Inventor
Lewis A. Dailey

March 21, 1950 L. A. DAILEY 2,500,933
CONTROL DEVICE FOR MACHINE TOOLS
Filed April 30, 1948 6 Sheets-Sheet 4

Inventor
Lewis A. Dailey

March 21, 1950     L. A. DAILEY     2,500,933
CONTROL DEVICE FOR MACHINE TOOLS
Filed April 30, 1948     6 Sheets-Sheet 5

Inventor
Lewis A. Dailey

March 21, 1950 L. A. DAILEY 2,500,933
CONTROL DEVICE FOR MACHINE TOOLS
Filed April 30, 1948 6 Sheets-Sheet 6

Inventor
Lewis A. Dailey

Patented Mar. 21, 1950

2,500,933

UNITED STATES PATENT OFFICE 2,500,933

CONTROL DEVICE FOR MACHINE TOOLS

Lewis A. Dailey, Oshkosh, Wis., assignor to The Bell Machine Company, Oshkosh, Wis., a corporation of Wisconsin Application April 30, 1948, Serial No. 24,392

18 Claims. (Cl. 60—97)

This invention relates to control systems for machine tools and refers particularly to a fluid pressure operated control system especially adapted for use on woodworking machines, such as boring machines.

In machines of this type a plurality of functions are performed by air cylinders which may be considered prime movers, and the performance of the collective functions of these prime movers defines and constitutes a work cycle. In a boring machine, for instance, there is an air-cylinder or prime mover, or a battery thereof, for operating the work "hold-downs" by which the work is held down on the table; while another air cylinder or prime mover or a battery thereof has the function of moving drill heads toward and from the work.

Moreover, there may be drill heads operating horizontally and others operating vertically, in which event there would be three functions being performed by the air cylinders or prime movers; one, holding down work during the boring operations and releasing the work after completion of the boring; two, moving the horizontal drill heads toward and from the work; and three, moving the vertical drill heads toward and from the work.

For the sake of simplicity the embodiment of the invention illustrated discloses only two functions being performed by the air cylinders or prime movers, namely, up and down actuation of the "hold-downs," and in and out actuation of one set of drill heads.

In machines of this type it is desirable that the work cycle be effected automatically once it has been initiated by the operator, and it is, therefore, an object of this invention to provide a control system which will automatically effect the sequential operation of the air cylinders or prime movers necessary for completion of a work cycle by the machine.

Another object of this invention is to provide a control system for a plurality of prime movers which may be set to effect automatic and continuous repetition of the work cycle.

While pneumatic control systems for machine tools are not new, one of the major difficulties of such systems heretofore available for use with woodworking machinery especially has been the inability to quickly and accurately adjust the time of starting and stopping of the several air cylinders or prime movers. It is another object of this invention, therefore, to provide a control system for a plurality of prime movers wherein adjustment of the time of starting and stopping the same can be easily and quickly effected without interrupting the operation of the system.

More specifically it is an object of this invention to provide a control system for a plurality of prime movers wherein the functions performed by the prime movers are controlled by timing cylinders, one for each function performed by the prime movers, so that by controlling reciprocation of the movable part of the timing cylinders the timing of the different functions can be independently effected.

A further object of this invention resides in the provision of a control system for governing the operation of a plurality of reversible prime movers which incorporates a reversing device for each prime mover having a movable part actuated from one position to another with a snap action by fluid pressure to insure immediate response of the prime movers to such actuation of the reversing devices.

Still another object of this invention is to provide a control system which may be entirely pneumatic or which may be partially electrical and partially pneumatic.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiment of the invention constructed according to the best modes so far devised for the practical application of the principles thereof, and in which.

Referring now particularly to the accompanying drawings in which like numerals indicate like parts throughout the several views, the numeral 4 designates generally the instrumentalities of the control system of this invention, which, for illustration, has been shown as incorporated in a horizontal boring machine 5 of the type used in woodworking to govern the operation of the machine.

Figure 1:
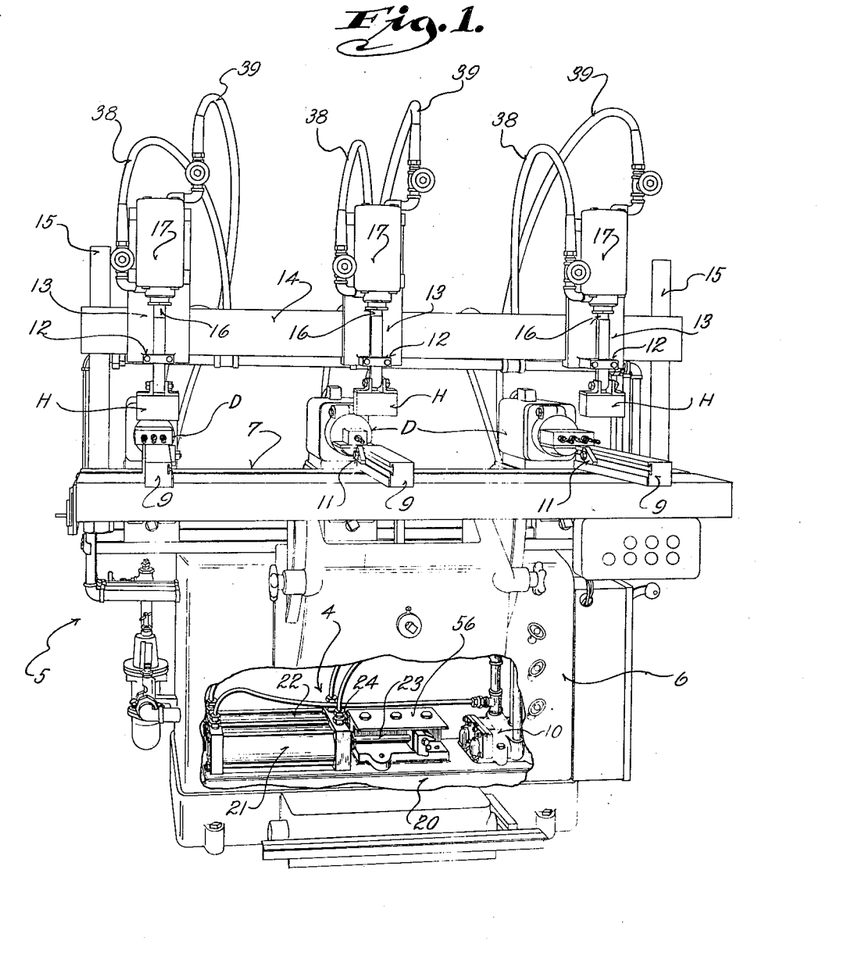
Figure 1 is a perspective view of a drilling machine of the type used in wood-working and illustrating the physical aspects of the application of this invention thereto.

Inasmuch as the invention does not concern the machine, its details have not been illustrated. It is sufficient to note that the machine comprises a suitable base 6 of hollow construction to receive the control instrumentalities 4. A tiltable work table 7 is mounted at the top of the base along with a plurality of boring heads D. Transverse supporting rails 9 mounted on and adjustable along the length of the table provide a work support, and the work is held on these rails by pressure feet or "hold-downs" H. Dogs 11 on the rails are adapted to engage the underside of the work to hold the same against being displaced from a predetermined position defined by suitable stops, not shown, during the drilling operation.

The pressure feet H, or "hold-downs" as they are termed in the art, are mounted for up and down sliding motion in guideways 12 carried by heads 13, the latter being adjustable along the length of a longitudinal supporting rail 14 overlying the table 7 and held spaced thereabove by uprights 15 secured to and projecting from the table at the opposite ends thereof.

Thus, a pressure foot or "hold-down" may be adjusted to overlie each transverse work supporting rail 9, and both may be adjusted to any position along the length of the supporting table to accommodate different size work. In addition, each pressure foot is connected with the ram 16 of an air cylinder 17. These cylinders are secured to the heads 13 in an upright position with their rams projecting downwardly to control raising and lowering of the "hold-downs."

Regardless of the number of hold-downs, it will be appreciated that the cylinders 17 perform but one function, namely, pressing the pressure feet H down onto the work resting on the rails 9, and lifting the pressure feet off the work to enable removal of the finished work from the machine.

The boring heads D are guided for bodily horizontal motion transversely of the table 7 and may also be adjusted longitudinally along the length of the table. Each boring head is adapted to carry one or more drill bits, and as is customary, includes an electric drive motor (not shown) for rotating the bits. The feeding of the drill bits into the work and retraction thereof from the work is effected by air cylinders, indicated generally by the numeral 18 (see Figure 2), one for each boring head.

Figure 2:
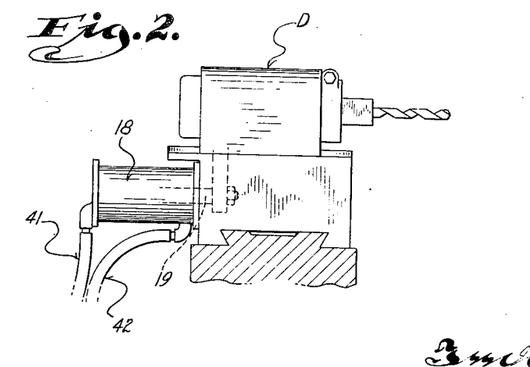
Figure 2 is a fragmentary side elevational view of one of the drill heads showing an air cylinder connected therewith.

Each cylinder 18 has a ram 19 connected with its boring head to slide the same bodily toward and from the work. These air cylinders, or prime movers as they may be termed, thus collectively perform one function, namely, drilling which, of course, entails advancing the drills into the work and retracting them from the work.

The air cylinders or prime movers 17 and 18 perform their functions by both a forward and a return stroke of their respective rams; and while a battery of such cylinders or prime movers is generally provided for each function, it will be understood that reference to a single air cylinder or prime mover to effect a drilling function or a "hold-down" function will encompass a battery of such units.

Figure 3:
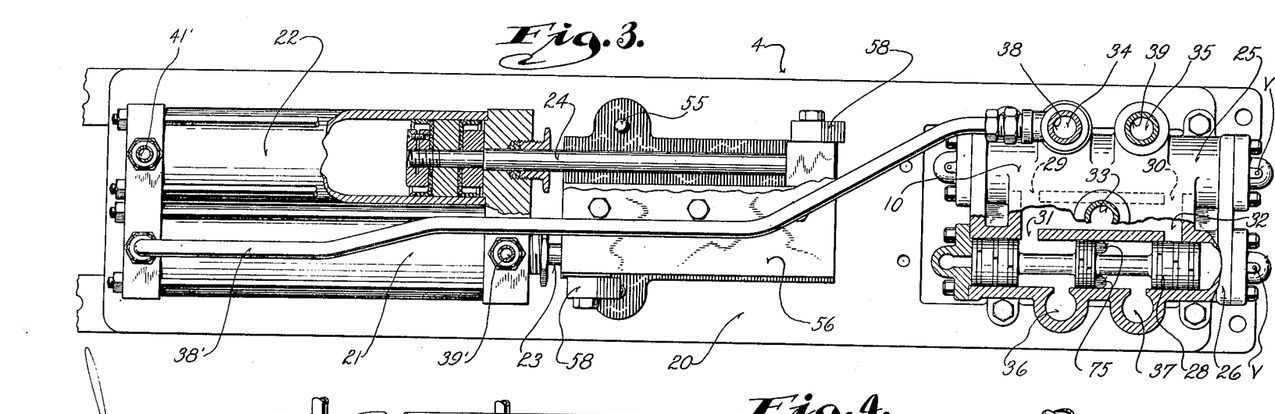
Figure 3 is an enlarged plan view of the control mechanism per se having parts thereof broken away and in section to show details.
Figure 4:
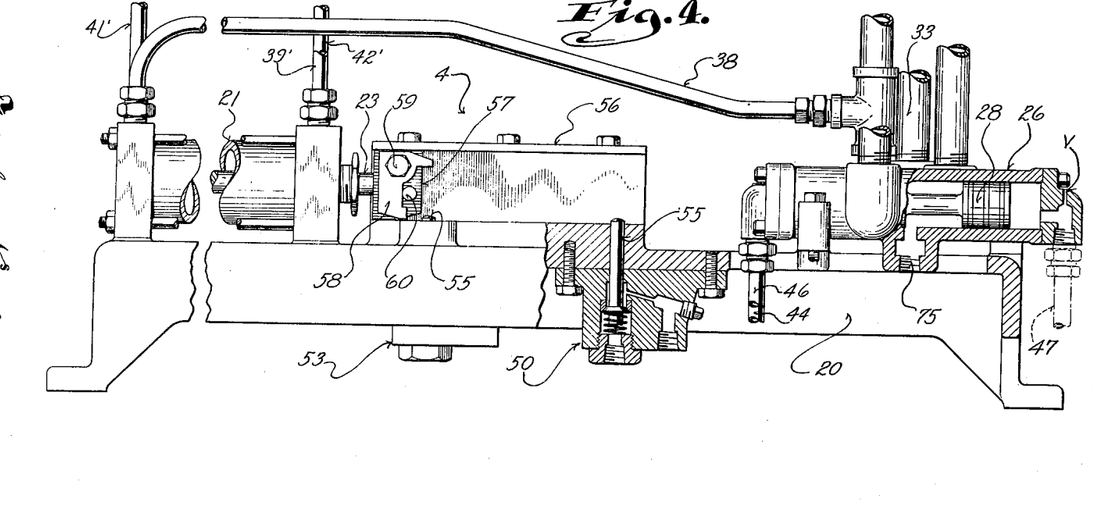
Figure 4 is a side view of the mechanism shown in Figure 3 and likewise having parts broken away and in section.

The control instrumentalities 4 are conveniently and compactly mounted on a separate plate 20 which may be either fixed to the floor upon which the woodworking machine rests or to the base 6 of the machine itself, but preferably inside the hollow interior of the base. For the "two-function" woodworking machine herein illustrated, the control instrumentalities comprise a pair of air cylinders 21 and 22 mounted in side by side relationship adjacent to one end of the supporting plate 20 and having rams 23 and 24 respectively projectable over the medial portion of the supporting plate toward the opposite end thereof and reciprocable in their cylinders upon the application of air pressure to one end or the other of the cylinders. These air cylinders are best termed timing cylinders since the functioning of the air cylinders 17 and 18 for the drill heads and hold-downs respectively depends not only upon back and forth travel of the rams of the timing cylinders but also upon the rate at which these rams reciprocate.

The control instrumentalities also include a pair of reversing valves 25 and 26 contained in a single valve housing 10 mounted on the supporting plate 20 at the end thereof opposite the timing cylinders. There is one reversing valve for each prime mover or battery thereof which is to perform one of the functions of the machine, and in the present case the reversing valve 25 is adapted to control the supply of air pressure to the hold-down cylinders 17 and to the timing cylinder 21, while the reversing valve 26 is adapted to control the supply of air pressure to the cylinders 18 for the drill heads and to the timing cylinder 22.

The reversing valves 25 and 26 have valve elements 27 and 28 respectively each of which is slidable endwise between two operative positions to connect its prime mover or movers with a source of air under pressure for forward or reverse operation. Each reversing valve also has two inlet ports, the ports 29 and 30 for the valve 25 and the ports 31 and 32 for the valve 26. Both sets of inlet ports 29—30 and 31—32 connect with a suitable pressure source through an air supply line 33.

The inlet ports of each pair thereof lead into their respective reversing valves from one side thereof and are spaced from one another along the length of their respective valve elements so that the inlet ports 29 and 30 lie substantially opposite outlet ports 34 and 35 for the valve 25, and outlet ports 36 and 37 for the valve 26.

The air cylinders or prime movers 17 controlled by the reversing valve 25 have their lower ends communicated with the outlet port 34 through air lines 38 so that the connection of the lower ends of the cylinders 17 with the source of pressure by means of the reversing valve 25 effects retraction of the rams 16 and consequently elevation of the pressure feet H off of a piece of work resting on the rails 9. The upper ends of the cylinders 17 are communicated with the outlet port 35 of reversing valve 25 through air lines 39 so that connection of the upper ends of these cylinders with the pressure source by means of the valve 25 effects extension of the rams 16 and consequently lowering of the pressure feet H down onto a piece of work resting on the rails 9.

A branch line 38' also connects the rear of the timing cylinder 21 with the outlet port 34, while a branch line 39' connects the front of the timing cylinder 21 with the outlet port 35. Hence the timing cylinder 21 is connected with the pressure source through port 34 for extension of its ram 23, and connected with the pressure source through port 35 for retraction of its ram 23.

The air cylinders or prime movers 18 for advancing and retracting the drill heads D are controlled by the reversing valve 26, as stated previously, and to this end have their rear ends communicated with the outlet port 36 of the valve 26 through air lines 41, so that the application of air pressure to the rear of these cylinders effects extension of their rams 19 and feeding of the drill bits into the work. The front ends of the cylinders 18 are communicated with the outlet port 37 of the reversing valve 26 through air lines 42 so that subjection of the front ends of these cylinders to air pressure effects retraction of their rams 19 to carry the drill heads away from the work.

A branch line 41' also connects the rear of the timing cylinder 22 with the outlet port 36, while a branch line 42' connects the front of the timing cylinder 22 with the outlet port 37. Hence the timing cylinder 22 is connected with the pressure source through port 36 for extension of its ram 24, and connected with the pressure source through port 37 for retraction of its ram 24.

Figures 7, 8:
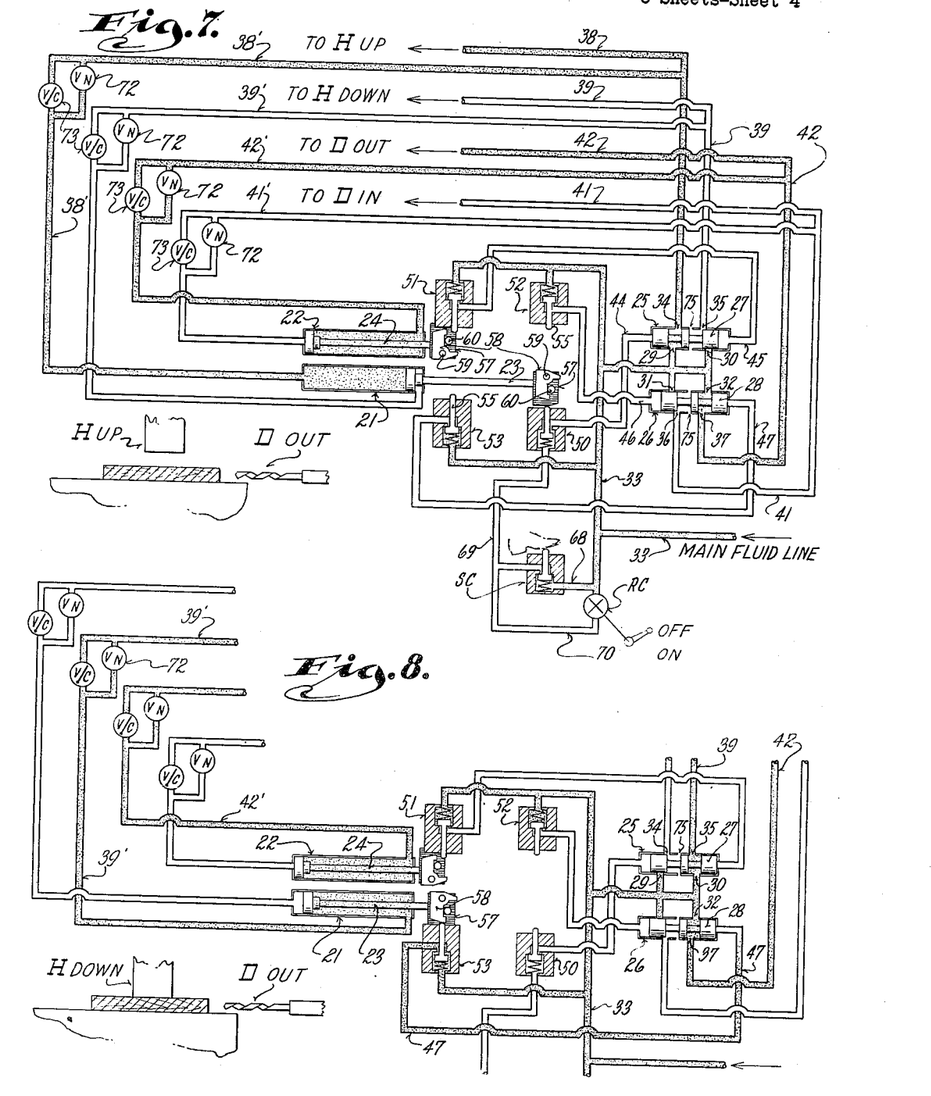
Figures 7, 8, 9, and 10 are diagrammatic views illustrating different stages in the operation of the control system for the performance of one complete work cycle.

In the Figure 7 diagram the control instrumentalities are shown maintaining the machine in an "at rest" condition by reason of the fact the valve element 27 of reversing valve 25 is in its left-hand position establishing communication between its inlet and outlet ports 29 and 34 respectively so that air pressure is maintained in the lower ends of the hold-down cylinders 17 to keep the pressure feet H elevated, and so that pressure is maintained in the rear of timing cylinder 21 to maintain the ram 23 thereof fully extended. In this "at rest" condition, the valve element 28 of reversing valve 26 is in its right-hand position establishing communication between its inlet and outlet ports 32 and 37 respectively so that air pressure is maintained in the front ends of the drill head cylinders 18 to hold the rams 19 thereof retracted, and so that pressure is maintained in the front end of the timing cylinder 22 thereby holding the ram 24 thereof fully retracted.

Considering the air cylinder 17 and 18 for the hold-downs and drill heads respectively to be reversible prime movers, it will be clear that the valve elements 27 and 28, in one position thereof, effect forward operation of their respective prime movers; and that reverse operation of the prime movers is effected when their respective valve elements are shifted to their other positions. In like manner the rams 23 and 24 of the timing cylinders 21 and 22 respectively are caused to travel in one direction in one position of their respective valve elements and to travel in the opposite direction in the other position of their respective valve elements.

The valve elements 27 and 28 of the reversing valves 25 and 26 are adapted to be "snap" actuated from one position to the other thereof at predetermined time intervals during the work cycle of the machine by means of air pressure. For this purpose the reversing valve 25 is connected with air lines 44 and 45 leading into the left and right-hand ends thereof, respectively to enable the valve element 27 to be subjected to air pressure at either one end or the other thereof. Application of air pressure to the left-hand end of the valve element 27 by means of air line 44 thus effects "snap" actuation of the valve element to its right-hand position establishing communication between inlet and outlet ports 30 and 35 respectively; while application of fluid pressure to the right-hand end of the valve element 27 by means of air line 45 effects "snap" actuation of the valve element to its left-hand position establishing communication between inlet and outlet ports 29 and 34 respectively.

In like manner, the opposite ends of the reversing valve 26 have air lines 46 and 47 leading into the left and right-hand ends thereof to effect snap actuation of valve element 28. Subjection of the left-hand end of valve element 28 to pressure by means of air line 46 effects snap actuation thereof to its right-hand position establishing communication between inlet and outlet ports 32 and 37 respectively; while subjection of the right-hand end of valve element 28 to pressure by means of air line 47 effects snap actuation of the valve element to its left-hand position establishing communication between inlet and outlet ports 31 and 36 respectively.

The air line 44 connects with the air supply line 33 through a control valve 50 and through either one of a pair of selector valves SC and RC in series with the control valve 50 and which will be described later.

The air line 45 connects with the supply line 33 through a control valve 51; the air line 46 connects with the supply line 33 through a control valve 52; and the air line 47 connects with the air supply line 33 through a control valve 53. The control valves 50, 51, 52 and 53 are normally closed poppet valves, and it will be apparent from their connections with the reversing valves that control valves 50 and 51 control actuation of the valve element 27 of reversing valve 25, while control valves 52 and 53 control actuation of the valve element 28 of reversing valve 26.

Each of the poppet control valves is opened by depression of its actuator 55 to effect application of fluid pressure to one end of its respective valve element for actuation thereof from one position to the other with a snap action.

The control valves are mounted on the supporting plate 20 between the timing cylinders and the reversing valves and have their actuators projecting up through the bottom of a bracket 56 fixed to the supporting plate. One pair of valves 50 and 53 is mounted on the plate 20 adjacent to the path of travel of the ram 23 of timing cylinder 21, in spaced apart relationship with respect to one another, and with their actuators 55 projecting toward the path traveled by the ram 23. The other pair of control valves 51 and 52 is also mounted on the plate 20 in spaced relationship to one another, along the path of travel of the ram 24 of timing cylinder 22, and likewise have their actuators projecting toward the path traveled by the ram 24.

The arrangement of control valves is such that cams 57 fixed on the outer ends of the rams 23 and 24 depress the actuators of control valves 50 and 52 and open these valves when the rams are fully extended. Hence, it will be apparent that each time the ram 23 reaches its fully extended position the control valve 50 will be opened by the cam 57 to effect application of pressure to the left-hand end of valve element 27, causing actuation thereof to its right-hand position. Likewise, each time the ram 24 reaches its fully extended position the control valve 52 will be opened to effect application of pressure to the left-hand end of valve element 28 causing the actuation thereof to its right-hand position.

The control valves 53 and 51 are located relatively close to the forward ends of the timing cylinders 21 and 22 respectively, and their actuators lie in the paths of travel of cams 58 carried by the rams 23 and 24 alongside their cams 57.

The control valve 53 is acted upon and momentarily opened by the cam 58 on the ram 23 during retraction thereof to effect application of air pressure to the right-hand end of valve element 28 to cause actuation of the same to its left-hand position. In a similar manner, the control valve 51 is acted upon and momentarily opened by the cam 58 on ram 24 during retraction thereof to effect application of pressure to the right-hand end of valve element 27 to cause actuation of the same to its left-hand position.

Figure 5:
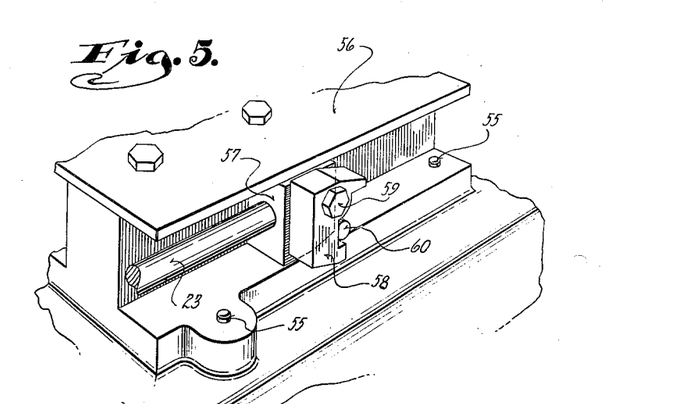
Figure 5 is a perspective view of one of the timing cylinder driven valve actuators illustrating the manner in which it operates upon one control valve during travel in one direction and upon another control valve during travel in the opposite direction.
Figure 6:
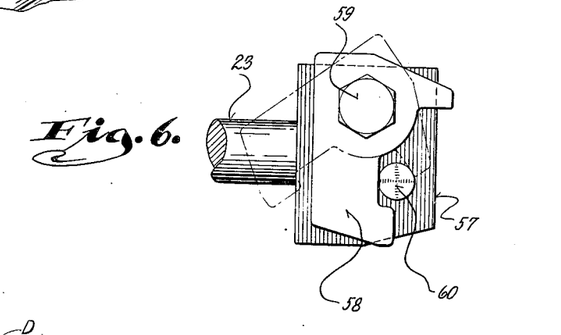
Figure 6 is a fragmentary detail view of one of the timing cylinder driven valve actuators.

It is to be noted, however, that the cams 58 are pivotally supported from their cams 57 as at 59 with the cam 58 on ram 23 free to swing in a clockwise direction about its pivot in passing over the actuator of the control valve 53 during extension of the ram, and with the cam 58 on ram 24 free to swing in a counter-clockwise direction about its pivot in passing over the actuator of control valve 51. Hence, the control valves 51 and 53 are not opened during forward travel or extension of the rams 23 and 24. Rotation of the cams 58 in the opposite direction, however, is precluded by means of pins 60 carried by the cams 57 and against which the cams 58 normally rest. Consequently, the control valves 51 and 53 are acted upon and momentarily opened by the cams 58 only during retraction of the rams of the timing cylinders and slightly before the rams reach their fully retracted positions.

Inasmuch as it is desirable that the control system of this invention be operable to effect either single cycle operation of the machine or repeat cycle operation at the will of an operator, the system is provided with the hereinbefore mentioned selector valves SC and RC, which enable the system to be set for single cycle operation or repeat cycle operation respectively. The valve SC is of the normally closed poppet type and is incorporated in a branch line 68 connecting between the air supply line 33 and a branch line 69 leading to the inlet of the control valve 50. Hence, air under pressure may flow to the inlet of the control valve 50 whenever the actuator of the selector valve SC is depressed by an operator to open the same.

The control valve RC is incorporated in a branch line 70 which connects the branch line 69 with the air supply line 33, and inasmuch as the valve RC is of the manually operated "off-on" type, it will be apparent that it can be set to a closed or "off" position so that the supply of air to the inlet of control valve 50 depends entirely upon opening of the selector valve SC by an operator. In like manner the selector valve RC may be set in an open or "on" position at which the inlet of the control valve 50 is at all times connected with the pressure source.

As stated previously, the direction in which the prime movers for the hold-downs and drill heads are caused to operate is determined by the direction in which the valve elements of their respective reversing valves have been actuated. Since actuation of the valve elements 27 and 28 is effected by opening of the control valves 50, 51, 52 and 53 in consequence to back and forth travel of the rams of the timing cylinders, it will be clear that the initiation of forward and reverse operation of the prime movers depends upon the rate of travel of the rams of the timing cylinders. Thus, the prime movers for the hold-downs and drill heads will be caused to operate at timed intervals determined solely by the rate of travel of the rams 23 and 24 of the timing cylinders.

Inasmuch as it may be necessary to curtail or prolong any function of the machine, it is essential that the rate of the travel of the rams of the timing cylinders be readily adjustable, and to this end each air line leading to the timing cylinders is provided with a needle valve 72 to regulate the flow of air thereinto. Likewise each of the air lines for the timing cylinders has a check valve 73 connected therein to allow air to exhaust freely from one end of each cylinder in consequence to the application of air pressure at the opposite end of the cylinder.

Metering valves may also be connected in the air lines 38, 39, 41 and 42 for the hold-down and drill head cylinders to provide control over the rate of descent and elevation of the pressure feet H and over the in and out travel of the drill heads D.

*Automatic single cycle operation*

In the operation of the control system to govern forward and reverse travel of the prime movers 17 and 18 for the performance of a single work cycle, the selector valve RC is actuated to "off" position so that the supply of air to the inlet of control valve 50 is governed solely by the poppet selector valve SC. In the "at rest" condition of the system depicted in Figure 7, the control valve 50 is held in open position by the cam 57 on the ram of timing cylinder 21, but the inlet of the control valve 50 is shut off from the air supply line 33 by the poppet selector valve SC. All of the other control valves are in their normally closed positions and have pressure at their inlets.

After a piece of work to be drilled is properly positioned on the supporting rails 9, the actuator of the poppet selector valve SC may be momentarily depressed by the operator to open the same to thereby bring air pressure into the air line 44 through the open control valve 50. Inasmuch as the air line 44 leads into reversing valve 25 at the left side of valve element 27, the latter is subjected to air pressure causing the same to be shifted to its right-hand position with a snap action to disrupt communication between ports 29 and 34 and to establish communication between inlet and outlet ports 30 and 35 respectively.

The valve element 27 is now in its position shown in Figure 8, and air under pressure flows through the valve 25 and the air lines 39 into the upper ends of the hold-down cylinders 17 to propel the pressure feet H downwardly toward and into engagement with the work resting on the supporting rails 9 to firmly clamp the work in place for the subsequent drilling operation. Simultaneously with shifting of the valve element 27 to its right-hand position air under pressure likewise flows through the valve 25 and air line 39' into the forward end of timing cylinder 21 to effect retraction of the ram 23 at a rate determined by the setting of the needle valve 72 in the line 39'. As soon as the ram 23 starts its retraction stroke the cam 57 on its outer end rides off of the actuator of control valve 50 permitting the same to close. Inasmuch as the drill bits may be advanced into the work as soon as the pressure feet H are in their operative clamping positions, the needle valve 72 in the air line 39' may be set to allow the ram 23 to be retracted relatively quickly.

As the ram 23 nears its fully retracted position the cam 58 thereon engages the actuator of control valve 53, as shown in Figure 8, to momentarily open the same. Momentary opening of control valve 53 in this manner brings air pressure into air line 47 leading to the right-hand end of reversing valve 26, causing the valve element 28 thereof to be shifted to its left-hand position (Figure 9) with a snap action. Actuation of the valve element 28 in this manner disrupts communication between ports 32 and 37 and establishes communication between inlet and outlet ports 31 and 36 respectively so that air under pressure flows through the valve 26 and the air lines 41 into the rear of the drill head cylinders 18. The rams 19 of the drill head cylinders thus begin their forward stroke and carry the drill bits toward and into the work on the supporting rails 9.

Figure 9:
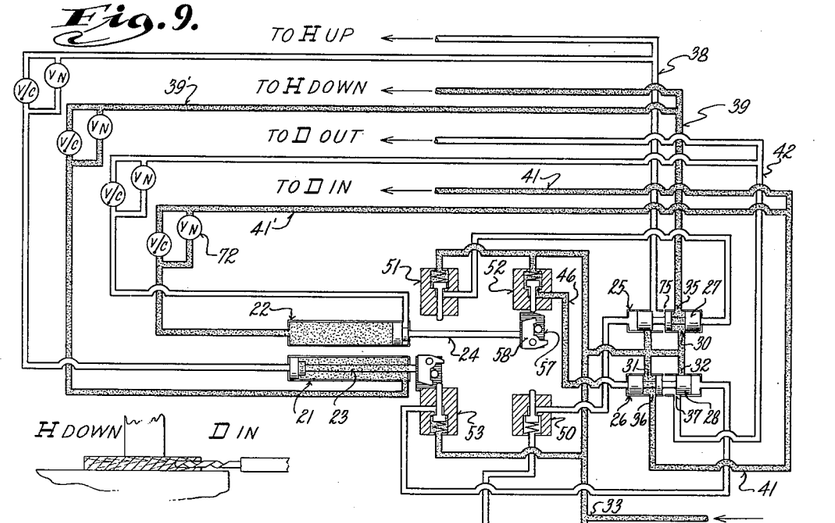

Simultaneously with actuation of the valve element 28 to its left-hand position shown in Figure 9, air under pressure flows through the valve 26 and air line 41' into the rear of timing cylinder 22 to cause extension of its ram 24 at a rate determined by the setting of needle valve 72 in the line 41'.

Figure 10:
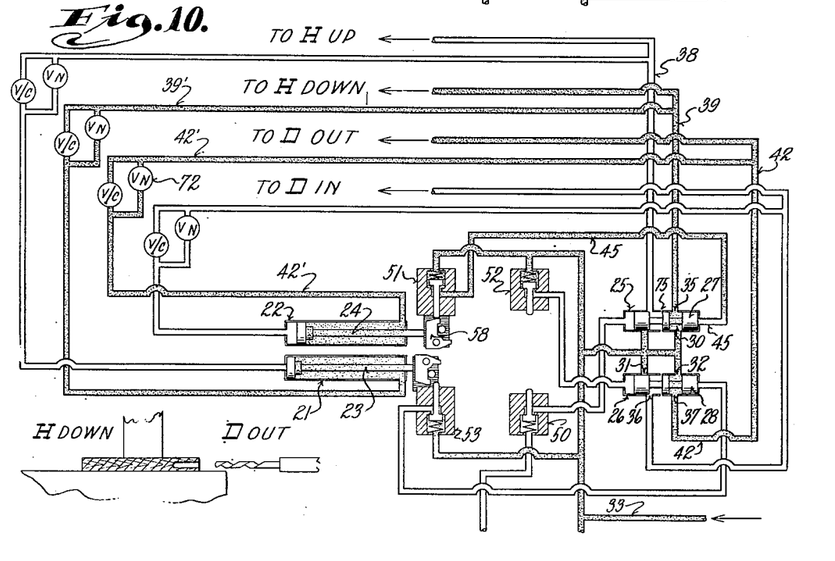

On the out-stroke of the ram 24 the cam 58 thereon pivots in a counter-clockwise direction as it is brought into engagement with the actuator of control valve 51 with the result that the cam rides over the actuator without opening the valve. As the ram 24 reaches its fully projected position shown in Figure 9, however, the cam 57 thereon engages the actuator of control valve 52 and opens this valve to cause air under pressure to flow therethrough to air line 46 and and hence into the left-hand end of reversing valve 26. This subjects the left-hand end of valve element 28 to pressure causing same to be returned with a snap action to its right-hand position shown in Figure 10 disrupting communication between inlet and outlet ports 31 and 36 respectively and establishing communication between inlet and outlet ports 32 and 37 respectively. In this position of valve element 28, therefore, air under pressure flows through valve 26 and air lines 42 into the front ends of the drill head cylinders 18 to effect retraction of their rams 19 and withdrawal of the drill heads and their bits from the work.

Simultaneously with return of the valve element 28 to its right-hand position, air under pressure is lead through valve 26 and air line 42' into the front of timing cylinder 22 so as to commence the retraction stroke of its ram 24 at a rate depending upon the setting of the needle valve 72 in the line 42'. Due to the fact that the functions of the prime movers in the embodiment disclosed are only those of holding down and drilling, and as the drilling operation has now been performed, the return stroke of the ram 24 may be effected at a substantially rapid rate to cause momentary opening of control valve 51 by the cam 58 as soon as possible after the drill bits have been fully disengaged from the work.

Momentary opening of the control valve 51 by the cam 58 near the end of the return stroke of ram 24 causes air under pressure to flow through the valve 51 and air line 45 into the right-hand end of reversing valve 25, thereby shifting the valve element 27 with a snap action to its left-hand position shown in Figure 7.

Return of the valve element 27 to its left-hand position as described, disrupts communication between the inlet and outlet ports 30 and 35 respectively and establishes communication between inlet and outlet ports 29 and 34 respectively so that air under pressure flows through the valve 25 and air lines 38 into the lower ends of the hold-down cylinders 17. Subjection of the lower ends of cylinders 17 to pressure in this manner causes retraction of their rams 16 and consequently elevation of the pressure feet H carried thereby to release the work for removal from the machine. Simultaneous with return of the valve element 27 to its left-hand position shown in Figure 7, air under pressure flows through the valve 25 and air line 38' into the rear of timing cylinder 21 to commence the out stroke of its ram 23 at a rate determined by the setting of the needle valve 72 in line 38'. The rate of travel of the ram 23 on its out stroke, of course, depends upon the amount of time required to remove the finished work from the machine and to properly position another piece of work on the rails 9.

During extension of the ram 23, the cam 58 thereon swings on its pivot as it engages the actuator of control valve 53 and consequently does not open this valve. As the ram 23 reaches its fully extended position shown in Figure 7, however, the cam 57 thereon again engages the actuator of control valve 50 to open the same. Since the inlet of control valve 50 is connected with the air supply line 33 through either one of the selector valves SC or RC, and as both of these valves are closed, it follows that the machine is now brought to rest with one work cycle having been completed. A new work cycle cannot be commenced until the operator again depresses the actuator of the poppet selector valve SC to open the same.

At the end of the work cycle during automatic single cycle operation of the control system, the valve elements 27 and 28 are in positions maintaining the pressure feet H elevated and the drill heads D retracted.

Automatic repeat cycle operation

If the selector valve RC is actuated to an on (open) position in which it at all times connects the inlet of control valve 50 with the air supply line 33, a new work cycle is commenced immediately upon opening of the valve 50 (in the manner described) at the end of each work cycle.

Hence, when the selector valve RC is closed or off the control system is set for automatic single cycle operation, while when the selector valve RC is open, that is, in an "on" position, the control system is set for automatic repeat cycle operation.

Air in the reversing valves 25 and 26 at either end of the valve elements is exhausted during snap actuation of these valve elements from one position to the other through small vents V (shown only in Figures 3 and 4) in the housing for the valves adjacent to the opposite ends of the valve elements. The air in the timing cylinders and in the hold-down and drill head cylinders, however, is exhausted by the pistons on their respective rams through ports 75 in the bottom of each reversing valve near the mid portion thereof. These ports communicate with the outlet port of each reversing valve opposite the inlet port closed by the valve element in either position of the valve element, as will be clear from reference to Figure 3.

Attention is directed to the fact that the entire drilling operation, which involves first advance of the drilling heads toward and into the work and then retraction of the same from the work, is performed between the times the pressure feet H descend onto the work and are elevated to free the work for removal from the machine. Hence, it will be apparent that any other operations to be performed on the work may be caused to follow in succession and at timed intervals after the descent of the pressure feet onto the work and prior to elevation of the pressure feet to release the work.

Any additional functions to be performed will, of course, entail the provision of additional reversing valves and timing cylinders one for each function, with the required control valves to effect actuation of the valve elements of the reversing valves in consequence to travel of the rams of their respective timing cylinders.

Figure 11:
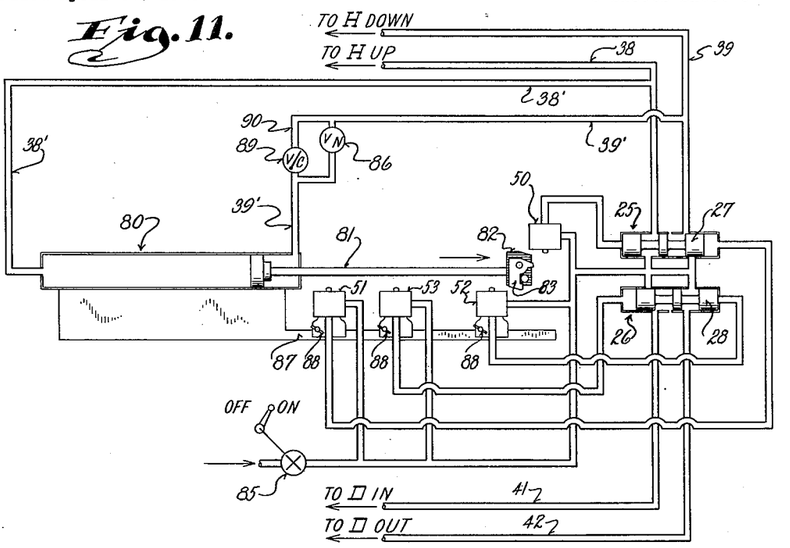
Figure 11 is a diagrammatic view illustrating a modified embodiment of the control system.

In the modified embodiment of the invention diagrammatically shown in Figure 11 the control system is the same as that previously described except for the fact that only one timing cylinder 80 is employed. In this case the ram 81 of the timing cylinder likewise has a cam 82 fixed on its outer end and a second cam 83 pivotally supported from the cam 82 in the same manner as the cams 58 on the rams of the previous embodiment.

The control valves which effect shifting of the valve elements of the reversing valves 25 and 26, however, are arranged so that the valves 52, 53, and 51 are actuated successively by the cam 83 in the order named during travel of the ram 81 in its retraction stroke. On the out stroke of the ram 81 the cam 83 swings past the actuators of the valves 51, 52, and 53 without opening them, but the control valve 50 is located so as to be acted upon and opened by the cam 82 on the ram as the ram reaches its fully extended position.

Hence, the sequence of operations of the hold-down and drill head cylinders remains the same as before described, and automatic repeat cycle operation is obtained upon setting of a selector valve 85 to an open or on position at all times connecting the inlet of control valve 50 with the pressure source. Single cycle operation is possible with this embodiment of the invention but requires the attention of an operator to actuate the selector valve 85 from on to off position at the end of each work cycle.

In this embodiment of the invention the speed of the ram 81 in its return stroke likewise may be adjusted and this is accomplished by means of a needle valve 86 in the air line leading into the front end of the cylinder. Adjustment of the times at which the air cylinders of the hold-downs and drill heads are to commence operation is effected by bodily adjustment of the control valves 51, 52, and 53 along a rail 87 fixed with relation to the timing cylinder 80 and upon which the valves may be clamped in any desired position as by means of thumb screws 88.

A check valve 89 in a by-pass 90 leading around the needle valve 86 allows the air to be freely exhausted ahead of the piston on the ram 81 during outward projection of the ram so that the out stroke of the ram may take place at a more rapid rate than the retraction stroke.

Although the control system shown in Figure 11 is adapted to govern the operation of two prime movers or sets thereof it will be apparent that additional prime movers can also be controlled by the provision of additional reversing valves therefor and control valves located along the path of travel of the ram 81 of the single timing cylinder, for instance, opposite the valves 51, 52 and 53. This is possible because of the fact that the reversing valve 25 alone controls the direction of travel of the ram 81 of the single timing cylinder and likewise controls the pressure feet H which must be brought down onto the work at the start of the work cycle and lifted off the work at the end of the work cycle with all other functions performed automatically between the times of lowering and elevation of the pressure feet H.

Figure 12:
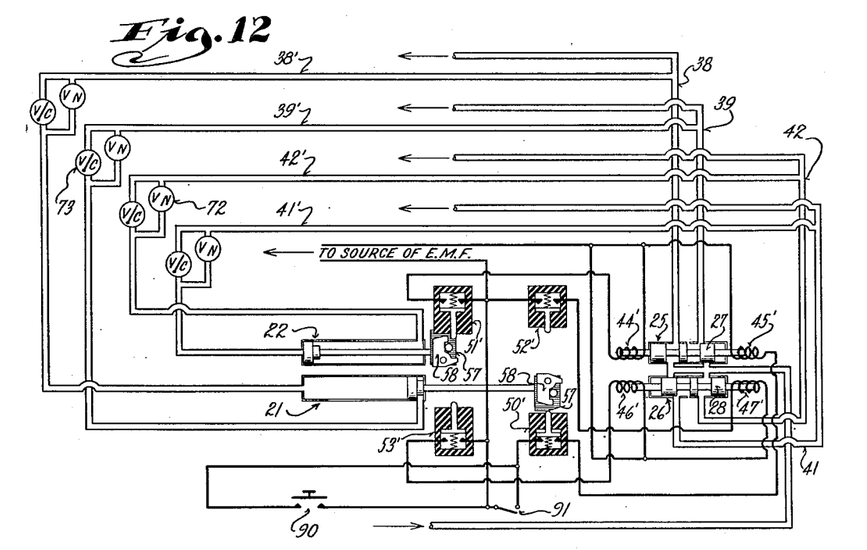
Figure 12 is a diagrammatic view illustrating another embodiment of the control system wherein the system is partially pneumatic and partially electrical.

The control system shown in the Figure 12 embodiment is in all respects similar to that of the preferred form of the invention with the exception that the valve elements 27 and 28 of the reversing valves are shifted electromagnetically by pairs of solenoids, 44′ and 45′ for the valve element 27, and 46′ and 47′ for the valve element 28. These solenoids act upon armature-like extensions on the opposite ends of the valve elements. Control switches 50′, 51′, and 53′ are substituted for the control valves 50, 51, 52 and 53 respectively, and each of these switches is connected in series with the energizing circuit for one of the solenoids so that the control switches govern energization of the solenoids and hence shifting of the valve elements 27 and 28.

All of the control switches are of the normally open push button type and have actuators similar to those of the control valves previously described and which are adapted to be acted upon by the cams on the outer ends of the rams of the timing cylinders.

Inasmuch as the electrical circuits are deemed obvious, it will suffice to state that closure of the control switch 50 by the cam 57 on the ram of timing cylinder 21 is adapted to complete the energizing circuit for the solenoid 45′ to cause the valve element of reversing valve 25 to be shifted with a snap action to its right-hand position; momentary closure of control switch 53′ by the cam 58 on the ram of timing cylinder 21 during the retraction stroke of the ram completes the energizing circuit for the solenoid 46′ thereby effecting shifting of the valve element of reversing valve 26 with a snap action to its left-hand position; closure of control switch 52′ by the cam 57 on the ram of timing cylinder 22 completes the energizing circuit for the solenoid 47′ when the ram reaches its fully extended position so as to cause the valve element 28 to be returned to its right-hand position with a snap action; and momentary closure of the control switch 51′ by the cam 58 during retraction of the ram of timing cylinder 22 completes the energizing circuit for the solenoid 44′ of reversing valve 25 causing return of the valve element 27 thereof to its left-hand position with a snap action.

In order to enable the control system of Figure 12 to be set for automatic single cycle operation or automatic repeat cycle operation, two selector switches, 90 and 91 are provided. Both of these selector switches are connected in series with the control switch 50' and its solenoid 45' as well as in parallel with each other.

The control switch 90 is of the normally open push button type and corresponds to the poppet selector valve SC of the preferred embodiment of the system. With switch 91 open, switch 90 must be momentarily closed at the end of each work cycle in order to initiate the next work cycle.

With switch 91 closed, however, the energizing circuit for solenoid 45' is completed each time the cam 57 on the ram of timing cylinder 21 closes control switch 50 at the end of a work cycle. Hence switch 91, when closed, sets the control system for automatic repeat cycle operation.

From the foregoing description taken in connection with the accompanying drawings, it will be readily apparent to those skilled in the art that this invention provides a control system for governing the operation of a number of prime movers, and which has a substantial range of adjustment to enable use thereof with prime movers whose periods of operation vary widely with relation to one another; and wherein immediate response of the prime movers to operation of the system is assured.

What I claim as my invention is:

1. A control system for a pair of reversible prime movers to be operated at timed intervals with respect to each other first forwardly and then in reverse to effect a plurality of functions which together constitute a work cycle, said system comprising: a timing unit having means adapted to be moved in response to fluid pressure through a cycle of operation the duration of which corresponds to the duration of the work cycle; control means governing the direction of operation of the prime movers, said control means including a reversing mechanism for each prime mover having a part movable from one position connecting its prime mover with a source of power for forward operation to a second position connecting its prime mover with a source of power for reverse operation; means connecting said timing unit and control means so that the timing unit is supplied with fluid pressure at the dictation of the control means and so that movement of the movable part of one of said reversing mechanisms to its first designated position initiates the cycle of operation of the timing unit and the work cycle of the prime movers; means rendered operative by the movable means of said timing unit during its cycle of operation for effecting shifting of the movable part of the other of said reversing mechanisms at timed intervals and with a snap action entirely independent of the rate of travel of the movable means of said timing unit from one to the other position thereof and back to its first designated position to effect connection of the prime mover controlled by said other reversing mechanism with a source of power for operation in reverse directions but at different time intervals; means rendered operative by the movable means of said timing unit near the end of its cycle of operation for effecting movement of the movable part of said first designated reversing mechanism to its second position with a snap action entirely independent of the rate of travel of the movable means of said timing unit, so as to effect connection of the prime mover of the first designated reversing mechanism with a source of power for operation in a reverse direction; and means rendered operative by the movable means of said timing unit substantially at the end of its cycle of operation for effecting shifting of the movable part of said first designated reversing mechanism with a similar snap action to its first designated position for connection of its prime mover with a source of power for operation in a forward direction and for initiating another cycle of operation of the timing means.

2. The control system set forth in claim 1 further characterized by the provision of manually operable means for precluding shifting of the movable part of said first designated reversing mechanism to its first designated position at the end of the work cycle whereby the system is capable of single cycle or automatic repeat cycle operation.

3. A control system for a plurality of reversible prime movers each adapted to perform a certain function by operation first forwardly and then in reverse with performance of the functions of all the prime movers once constituting a work cycle, said control system comprising: fluid pressure operated timing cylinders equal in number to the number of prime movers; a reversing mechanism common to each prime mover and one of the timing cylinders, each reversing mechanism including a part movable in opposite directions from a first position connecting its prime mover with a source of power for forward operation and connecting its timing cylinder with a source of fluid pressure for travel of the ram of said timing cylinder in one direction, to a second position connecting its prime mover with the source of power for reverse operation and connecting its timing cylinder with the source of fluid pressure for travel of the ram of said cylinder in the opposite direction; means cooperable with the rams of the timing cylinders for effecting transfer of said parts of the reversing mechanisms from their first to their second positions with a snap action as the rams of the cylinders near one limit of their motion; and other means cooperable with the rams of the timing cylinders for effecting return of said parts of the reversing mechanisms to their first designated positions with a similar snap action as the rams of the cylinders near the other limit of their motion.

4. A control system for a plurality of reversible prime movers each adapted to perform a certain function by operation first forwardly and then in reverse with performance of the functions of all the prime movers once constituting a work cycle, said control system comprising: fluid pressure operated timing cylinders equal in number to the number of prime movers; a reversing mechanism common to each prime mover and one of the timing cylinders, each reversing mechanism including a part movable by fluid pressure in opposite directions from a first position connecting its prime mover with a source of power for forward operation and connecting its timing cylinder with a source of fluid pressure for travel of its ram in one direction, to a second position connecting said prime mover with the source of power for reverse operation and connecting said timing cylinder with the source of fluid pressure for travel of its ram in the opposite direction; means cooperable with the ram of each timing cylinder for effecting transfer of said part of one of the reversing mechanisms from one position to the other position thereof with a snap action in consequence to travel of the rams of the cylinders in one direction; and other means cooperable with the ram of each timing cylinder for effecting transfer of said part of one of the reversing mechanism back to its first designated position with a snap action in consequence to travel of the rams of the cylinders in the other direction.

5. A control system for a plurality of reversible prime movers to be operated at timed intervals with respect to each other first in one direction and then in the opposite direction to effect a plurality of functions which together constitute a work cycle, said control system comprising: timing cylinders equal in number to the number of prime movers; a reversing mechanism common to each prime mover and one of the timing cylinders, each reversing mechanism including means movable in opposite directions between two operative positions with movement of said means from one position to the other effecting reverse operation of its prime mover and reverse travel of the ram of its timing cylinder; means cooperable with the ram of one of said timing cylinders for effecting transfer of said movable means of one of the reversing mechanisms from one position to the other position thereof with a snap action so as to effect operation of its prime mover in one direction and reversal of the direction of travel of the ram of said timing cylinder; means cooperable with the rams of said timing cylinders for successively effecting transfer of said movable means of the other of said reversing mechanisms with a snap action first from one position to the other position thereof and then back to the first position thereof at timed intervals but during the time said movable means of the first designated reversing mechanism remains in its actuated position; and means cooperable with the ram of a timing cylinder other than the first designated timing cylinder for effecting return of said movable means of the first designated reversing mechanism with a snap action to its first named position.

6. A control system for a plurality of reversible prime movers to be operated at timed intervals with respect to each other first forwardly and then in reverse to effect a plurality of functions which together constitute a work cycle, said control system comprising: a timing device having actuating means movable in opposite directions between defined limits and at a predetermined rate; a reversing mechanism for each prime mover, each reversing mechanism including means movable in opposite directions between two operative positions in the first of which positions said movable means effects forward operation of its prime mover and in the second of which positions said movable means effects reverse operation of its prime mover; means cooperable with said actuating means for effecting transfer of said movable means of one of the reversing mechanisms to said first position thereof with a snap action to effect forward operation of its prime mover and the initiation of a work cycle; means cooperable with said actuating means for successively effecting transfer of said movable means of the other of said reversing mechanisms with a snap action and at timed intervals to the first of their positions and then back to the second of their positions so as to complete the functions of the prime movers governed by the other of said reversing mechanisms; and other means cooperable with said actuating means for effecting transfer of said movable means of the first designated reversing mechanism to the second position thereof with a snap action so as to effect reversal of the direction of operation of its prime mover and completion of the work cycle.

7. A control system for a plurality of reversible fluid pressure operated prime movers to be operated at timed intervals with respect to each other first forwardly and then in reverse to effect a plurality of functions which together constitute a work cycle, said control system comprising: fluid pressure operated timing means having actuating means movable in opposite directions between defined limits and at a predetermined rate; a reversing mechanism for each prime mover, each reversing mechanism including a part movable in opposite directions between a first operative position connecting its prime mover with a source of fluid pressure for forward operation of its prime mover, and a second operative position connecting its prime mover with the source of fluid pressure for reverse operation; connections between said fluid pressure operated timing means and one of said reversing mechanisms whereby the movable part of the latter when in one position connects said fluid pressure operated timing means with a source of fluid pressure producing movement of its actuating means in one direction, said part when in its other position connecting the timing means with the source of fluid pressure producing movement of its actuating means in the reverse direction; means cooperable with said actuating means for effecting transfer of said parts of the reversing mechanisms from one position to the other position thereof with a snap action in consequence to movement of said actuating means with transfer of said parts occurring at timed intervals; and other means cooperable with said actuating means for effecting return of said parts of the reversing mechanisms to their first designated positions with a snap action in consequence to movement of said actuating means with such return of said parts to their first designated position likewise being effected at timed intervals.

8. A control system for a plurality of reversible fluid pressure operated prime movers to be operated at timed intervals with respect to each other first forwardly and then in reverse to effect a plurality of functions which together constitute a work cycle, said control system comprising: fluid pressure operated timing cylinders equal in number to the number of prime movers; a reversing mechanism common to each prime mover and timing cylinder, each reversing mechanism including a part movable in opposite directions from one operative position connecting both its prime mover and timing cylinder with a source of fluid pressure for forward operation of its prime mover and for travel of the ram of said timing cylinder in one direction, to another operative position connecting both its prime mover and timing cylinder with a source of fluid pressure for reverse operation of its prime mover and for travel of the ram of its timing cylinder in the opposite direction; means acted upon by the rams of the timing cylinders for effecting transfer of said parts of the reversing mechanisms from one position to the other position thereof with a snap action during travel of the rams in one direction; and other means acted upon by the rams of the timing cylinders for effecting return of said parts of the reversing mechanisms to their first designated positions with a snap action during travel of the rams of the cylinders in the opposite direction.

9. The control system set forth in claim 3 wherein said movable parts of the reversing mechanisms are fluid pressure responsive and wherein said means which is acted upon by the rams of the timing cylinders comprises valves actuated by said rams of said cylinders for effecting subjection of said parts of the reversing mechanisms to the source of fluid pressure and transfer of said parts from one position to the other position thereof with a snap action.

10. A control system for a plurality of prime movers to be operated at timed intervals with respect to each other to effect a plurality of functions which together constitute a work cycle, comprising: fluid pressure responsive timing cylinders, equal in number to the number of functions to be performed by the prime movers, each timing cylinder having a ram adapted to be reciprocated at a predetermined rate in consequence to alternate subjection of the ends of its timing cylinder to fluid pressure; control elements, two for each timing cylinder; cooperating means on the control elements and the rams of the timing cylinders by which one control element of each timing cylinder is actuated during each stroke of its ram; and means governed by said control elements for separately connecting the ends of each timing cylinder with a source of fluid pressure to effect reciprocation of the rams of the cylinders and for connecting the prime movers with a source of power to operate the same in the performance of a work cycle with the operation of the prime movers taking place at intervals determined by the sequence in which the control elements are actuated by the rams of the timing cylinders and the rate of travel of the rams, one control element of each timing cylinder when actuated by travel of its ram in one direction effecting connection of its cylinder with the source of fluid pressure to produce travel of its ram in the opposite direction, and the other control element of each timing cylinder when actuated by such reverse travel of its ram effecting connection of a cylinder other than its respective cylinder with the source of fluid pressure to produce travel of the ram of said other cylinder in the direction to effect actuation of the first designated control element of said other cylinder, whereby back and forth reciprocation of each ram to actuate its control elements once results in the performance of a work cycle by the prime movers, with the last actuated control element being one of said first designated control elements so that at the end of a work cycle, the system is left in condition for repetition of the work cycle.

11. A control system for a pair of reversible fluid pressure operated prime movers, comprising: a reversing valve for each prime mover for governing connection of the same with a source of fluid pressure, each of said reversing valves having a valve element movable by fluid pressure from a first position connecting its prime mover with the source of fluid pressure for forward operation to a second position connecting its prime mover with the source of fluid pressure for reverse operation; a timing cylinder associated with each reversing valve and having a ram movable back and forth in response to subjection of one end or the other of its cylinder to fluid pressure; means connecting the ends of each timing cylinder with the source of fluid pressure through its reversing valve so that the direction of travel of the rams of the cylinders is likewise determined by the positions of the valve elements of their respective reversing valves; a pair of normally closed control valves associated with each reversing valve for governing the application of fluid pressure to the valve element thereof, opening of one valve of each pair effecting subjection of its associated valve element to fluid pressure to cause shifting of the element from its first position to the second position thereof with a snap action, and opening of the other valve of each pair effecting subjection of its associated valve element to fluid pressure to cause shifting of the element from its second position to the first position thereof likewise with a snap action; actuating means means connected with each of said rams to move therewith during back and forth travel of the rams; and means mounting said control valves in fixed relationship to said timing cylinders with one control valve of each pair in position to be operated upon and opened by the actuating means of one of the rams during travel of the rams in one direction, and with the other control valve of each pair in position to be operated upon and opened by the actuating means of one of the rams during travel of the rams in the opposite direction.

12. The control systems set forth in claim 11 further characterized by the provision of means for adjusting the rate of travel of the ram of each of the timing cylinders.

13. The control system set forth in claim 11 wherein said timing cylinders are connected with the source of fluid pressure through metering valves by which the rate of travel of the rams of the cylinders may be regulated at will.

14. A control system for a pair of reversible fluid pressure operated prime movers each of which performs a certain function by operation first forwardly and then in reverse and wherein the prime movers are to be operated for different time intervals with one performance of said functions of the prime movers constituting a work cycle, said system comprising: a reversing valve for each prime mover for governing connection of the same with a source of fluid pressure, each of said reversible valves having a valve element movable by fluid pressure from a first position connecting its prime mover with a source of fluid pressure for forward operation to a second position connecting its prime mover with the source of fluid pressure for reverse operation; a timing cylinder associated with each reversing valve and having a ram movable back and forth in response to subjection of one end or the other of its cylinder to fluid pressure; means connecting the ends of each timing cylinder with the source of fluid pressure through its reversing valve so that the direction of travel of the rams of the cylinders is likewise determined by the positions of the valve elements of their respective reversing valves; a pair of normally closed control valves associated with each reversing valve for governing the application of fluid pressure to the valve element thereof, opening of one valve of each pair effecting subjection of its associated valve element to fluid pressure to cause shifting of the element from one position to the other position thereof with a snap action, and opening of the other valve of each pair effecting subjection of its associated valve element to fluid pressure to cause return thereof to its first designated position with a snap action; actuating means connected with each of said rams to travel back and forth therewith; and means mounting said control valves in fixed relationship to said timing cylinders with one control valve of each pair thereof in position to be operated upon and opened by the actuating means of one of the rams during travel of the rams in one direction, and with the other control valve of each pair thereof in position to be operated upon and opened by the actuating means of a ram other than that which operates upon its associated control element during travel of said other rams in the opposite direction.

15. The control system set forth in claim 14 wherein opening of one of the pair of control valves for one of said reversing valves effects initiation of a work cycle, and wherein opening of the other of said pair of control valves effects termination of the work cycle.

16. A control system for a plurality of reversible fluid pressure operated prime movers each of which performs a certain function by operation first forwardly and then in reverse and wherein the prime movers are to be operated at timed intervals with one performance of all their functions constituting a work cycle, said system comprising: fluid pressure operated timing cylinders equal in number to the number of prime movers, and each having a reciprocable ram; a reversing valve common to each prime mover and one of said timing cylinders, each of said reversing valves having a valve element movable by fluid pressure from a first position connecting its prime mover with the source of fluid pressure for forward operation to a second position connecting its prime mover with the source of fluid pressure for reverse operation; means connecting the ends of each timing cylinder with the source of fluid pressure through its reversing valve so that the direction of travel of the rams of the cylinders is likewise determined by the positions of the valve elements of their respective reversing valves; actuating means connected with each of said rams to travel back and forth therewith; a pair of normally closed control valves mounted in fixed relation to each timing cylinder with one control valve of each pair in position to be operated upon and opened by the actuating means of its ram in consequence to travel of the ram in one direction, and with the other control valve of each pair thereof in position to be operated upon and opened by the actuating means of its ram in consequence to travel of the ram in the opposite direction; and means connecting said reversing valves with the source of fluid pressure through said control valves so that the control valves govern the application of fluid pressure to the valve elements of the reversing valves, said last named means connecting one of each pair of control valves with the reversing valve with which its timing cylinder is associated, and connecting the other of each pair of control valves with a different reversing valve.

17. A control system for governing the functioning of a reversible prime mover, comprising: a timing cylinder having a fluid pressure actuated ram movable in opposite directions; a reversing device connected with the prime mover to control the application of power thereto, said reversing device having a fluid pressure responsive element movable from a position connecting said prime mover with the source of power for forward operation to a second position connecting said prime mover with the source of power for reverse operation; means including ducts connecting opposite ends of said timing cylinder with a source of fluid pressure through the reversing device so that the direction of travel of the ram of the timing cylinder is likewise determined by the position of the movable element of the reversing device; and means including valves actuated by the ram of the timing cylinder for applying fluid pressure upon the movable element of the reversing device to move the same with a snap action to one position or the other depending upon which of the valves was operated, so that the response of said movable element and consequently the functioning of the prime mover is controlled and timed by the timing cylinder.

18. The control system set forth in claim 17 further characterized by the provision of valve means connected in at least one of the ducts leading to the opposite ends of the timing cylinder whereby the rate of travel of the ram of the timing cylinder at least in one direction is adjustable.

LEWIS A. DAILEY.

REFERENCES CITED

The following references are of record in the file of this patent:

UNITED STATES PATENTS

| Number | Name | Date |
|---|---|---|
| 1,799,113 | Miedbrodt | Mar. 31, 1931 |
| 1,912,184 | Ferris et al. | May 30, 1933 |
| 2,209,608 | Nye et al. | July 30, 1940 |
| 2,277,640 | Harrington | Mar. 24, 1942 |
| 2,302,115 | Gazey | Nov. 17, 1942 |
| 2,318,031 | Tucker | May 4, 1943 |
| 2,352,184 | Bullard | June 27, 1944 |
| 2,436,406 | Snader | Feb. 24, 1948 |